United States Patent Office 3,296,026
Patented Jan. 3, 1967

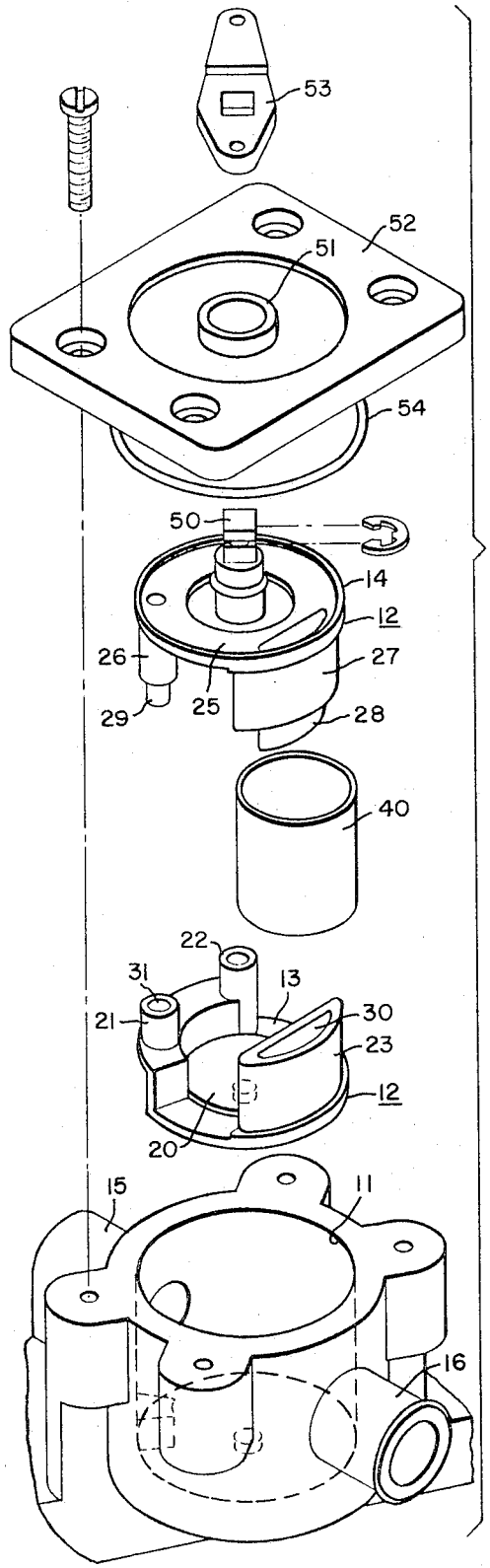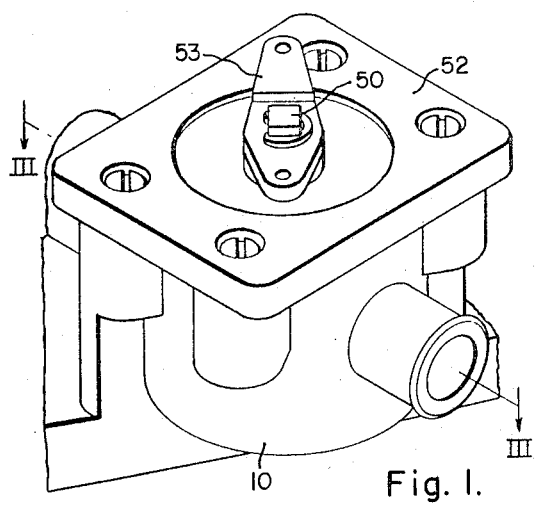
Fig. 1.
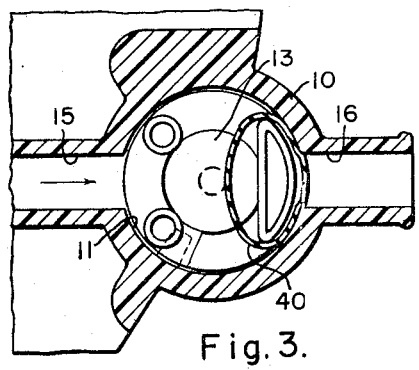
Fig. 3.
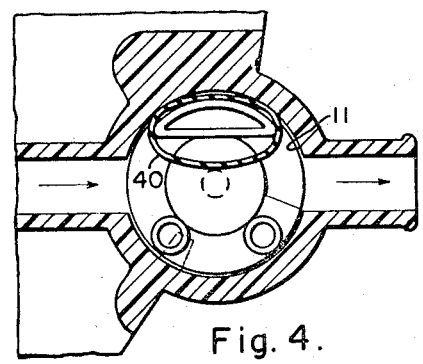
Fig. 4.
INVENTOR
Olan L. Long
ATTORNEY

3,296,026
ROTARY VALVE HAVING RENEWABLE
SEALING SURFACE
Olan L. Long, Hilliard, Ohio, assignor to Westinghouse
Electric Corporation, Pittsburgh, Pa., a corporation of
Pennsylvania
Filed June 25, 1964, Ser. No. 377,855
2 Claims. (Cl. 137—329.05)

The present invention relates to valves and more particularly to fluid valves of the so-called rotary plug valve type.

Rotary plug valves are of course well known. Obvious sealing problems occur when such valves are used under conditions where dirt and grit may pass through the valve in relatively large quantities such as when the valve is used as an outlet valve for a dishwashing machine or the like.

It is a principal object of the present invention to provide an improved rotary plug valve that is both simple and inexpensive in construction and that will be self-cleaning in operation for use in controlling the flow of relatively dirty fluids.

Another object of the invention is to provide a self-cleaning rotary plug valve arrangement that functions to move the sealing surfaces to thereby expose different sealing surfaces as the valve is used.

In accordance with the invention, the rotary plug valve body is provided with a relatively loosely fitting rotatable core having an elongated member adapted to be positioned in front of the discharge outlet when the valve is in the closed position. An endless ring or band of resilient material is loosely positioned to surround the elongated member so that the force of fluid pressure within the valve body will press the sealing band against the discharge outlet in the sealing relation. As the valve core is rotated to the open position, the sealing band that had been pressed into engagement with the discharge outlet is dragged slightly by the pressure of such sealing contact to cause the endless sealing band to be moved about the elongated member to thereby expose a different sealing surface upon the next closure of the valve.

Further objects, features and the attendant advantages of the invention will be apparent with reference to the following specification and drawing, in which:

FIGURE 1 is a perspective elevation of the rotary plug valve;

FIG. 2 is an exploded perspective view to show the assembly of the valve;

FIG. 3 is a section of the line III—III of FIG. 1 showing the valve in the valve closed position; and FIG. 4 is a view similar to FIG. 3, but showing the valve in the valve opened position.

Referring to FIGS. 1 and 2 of the drawing, the valve is comprised of a valve body 10 which may be formed of any suitable material such as molded plastic or the like. The valve body 10 is provided with a valve cavity 11 of some suitable shape not necessarily cylindrical as shown within which is loosely positioned a rotary valve core 12 which may actually be comprised of two complementary core parts 13 and 14. An inlet bore 15 and an outlet bore 16 extend through the side walls of the valve body 10 into the valve cavity 11 as shown.

The first valve core part 13 is comprised of a bottom end surface 20 and a plurality of upstanding tongue elements 21, 22 and 23. The second valve core part 14 is comprised of a top end surface 25 and a plurality of downwardly extending tongue elements such as shown at 26, 27. The two core parts 13, 14 are thus complementary to fit together by means of the shoulders such as 28, 29 and the recesses such as 30, 31 to form an assembled rotary valve core 12. The two respective tongue members 23, 27 thus form an elongated member adapted to extend across the discharge outlet 16 such as shown by FIG. 3 when the valve is in the closed position. During the assembly of the valve core the endless ring or band 40 of resilient sealing material such as rubber or the like is loosely positioned around the tongues 23, 27 forming the elongated member in the assembled relation.

An operating shaft 50 extends from the top surface 25 of the valve core through the aperture 51 of the valve body closure plate 52 and an operating lever 53 is affixed to the end of the shaft 50 after the valve is assembled. A sealing ring 54 functions to seal the closure plate 52 to the valve body 10 in an obvious manner.

Referring now to FIGS. 3 and 4 of the drawing, the operation of the valve will now be explained. When the valve is in the closed position of FIG. 3 of the drawing, the pressure of fluid within the valve cavity 11 will enter behind the sealing band 40 to force the band into tight engagement with the inside edges of the outlet opening 16 and deform the band 40 to protrude slightly into the outlet 16 as shown, thus forming a tight seal. Upon rotation of the valve core to the valve open position of FIG. 4, the band 40 that had been protruding into the outlet 16 will be dragged slightly to rotate about the tongues 23, 27 forming the elongated member to thus expose a different surface of the band for sealing into the outlet when the valve core is next rotated to the valve closed position. The pressure of fluid within the valve cavity 11 may also cause some slight dragging of the valve sealing band 40 against the walls of the valve cavity when the core is rotated from the valve open to the valve closed position. Thus, a self-cleaning and clearing action of the valve is obtained upon each movement of the valve core.

Various modifications will occur to those skilled in the art.

I claim as my invention:

1. A rotary plug valve comprising, a valve body having a valve cavity and inlet and outlet openings extending through the side walls of said body into said cavity, a valve core adapted to be loosely fitting and rotatable within said cavity, an elongated member carried by said core to extend across said outlet opening when said core is in the valve closed position, and an endless ring sealing member of resilient sheet material positioned to loosely surround said elongated member to be carried thereby into sealing relation with said outlet by the force of fluid pressure within said valve cavity when said core is in the valve closed position, said valve core being comprised of two complementary parts, one of said parts comprising a bottom end surface and a plurality of upstanding tongue elements, the other of said parts comprising a top end surface and a plurality of downwardly extending tongue elements, the core being assembled with the respective tongue elements of said parts joined in interfitting relation and said elongated member being formed of respective ones of said interfitting tongue elements.

2. A rotary plug valve comprising, a valve body having a cylindrical valve cavity and inlet and outlet openings extending through the side walls of said body into said cavity, a valve core adapted to be loosely fitting and rotatable within said cylindrical cavity, an elongated member carried by said core to extend across said outlet opening when said core is in the valve closed position, and an endless ring sealing member of resilient sheet material positioned to loosely surround said elongated member to be carried thereby into sealing relation with said outlet by the force of fluid pressure within said valve cavity when said core is in the valve closed position, said valve core being comprised of two complementary parts, one of said parts comprising a bottom end surface and a plurality of upstanding tongue elements, the other of said parts comprising a top end surface and a plurality of downwardly extending tongue elements, the core being assembled with the respective tongue elements of said parts joined in interfitting relation and said elongated member being formed of respective ones of said interfitting tongue elements.

References Cited by the Examiner

UNITED STATES PATENTS

| | | | |
|---|---|---|---|
| 2,534,577 | 12/1950 | Courtot | 137—625.42 XR |
| 2,812,154 | 11/1957 | Nordstrand | 251—251 |
| 3,045,701 | 7/1962 | Graham | 251—317 XR |

ALAN COHAN, *Primary Examiner.*

HAROLD WEAKLEY, *Examiner.*